United States Patent
Strain

(10) Patent No.: US 7,093,681 B2
(45) Date of Patent: Aug. 22, 2006

(54) DRIVE TRAIN ASSEMBLY FOR USE IN POWERED VEHICLES OR TRAILERS

(75) Inventor: Stuart Strain, Brinkin (AU)

(73) Assignee: James W. Cooper, Larrakeyah (AU)

( * ) Notice: Subject to any disclaimer, the term of this patent is extended or adjusted under 35 U.S.C. 154(b) by 335 days.

(21) Appl. No.: 10/182,017

(22) PCT Filed: Dec. 5, 2001

(86) PCT No.: PCT/AU01/01568

§ 371 (c)(1),
(2), (4) Date: Sep. 26, 2003

(87) PCT Pub. No.: WO02/46030

PCT Pub. Date: Jun. 13, 2002

(65) Prior Publication Data

US 2004/0089495 A1    May 13, 2004

(30) Foreign Application Priority Data

Dec. 5, 2000    (AU) .................................... PR1899

(51) Int. Cl.
  *B62D 53/00*    (2006.01)
  *B62D 59/04*    (2006.01)
(52) U.S. Cl. ..................................... 180/14.2; 180/247
(58) Field of Classification Search .............. 180/14.2, 180/14.3, 14.4, 24.11, 24.12, 247, 348, 355, 180/356, 361, 363, 371, 372, 383–385
See application file for complete search history.

(56) References Cited

U.S. PATENT DOCUMENTS

| 4,027,738 A | * | 6/1977 | Lundin | 180/14.3 |
| 4,381,828 A | * | 5/1983 | Lunn et al. | 180/247 |
| 4,502,557 A |   | 3/1985 | Anderson | 180/14.2 |
| 4,625,821 A | * | 12/1986 | Aumont et al. | 180/14.2 |
| 4,627,512 A |   | 12/1986 | Cohessy | 180/247 |
| 5,141,088 A |   | 8/1992 | Kurihara et al. | 192/67 R |
| 5,147,003 A |   | 9/1992 | De Monclin | 180/14.2 |
| 5,950,750 A | * | 9/1999 | Dong et al. | 180/24.09 |
| 2001/0013440 A1 | * | 8/2001 | Izumi et al. | 180/247 |

FOREIGN PATENT DOCUMENTS

| AU | A-77124/91 | 11/1991 |
| DE | 27 06 166 A1 | 2/1977 |

* cited by examiner

*Primary Examiner*—Paul N. Dickson
*Assistant Examiner*—Laura B. Rosenberg
(74) *Attorney, Agent, or Firm*—Francis LawGroup

(57) ABSTRACT

A drive train assembly for use in powered vehicles or trailers having at least one axle of driving wheels. The assembly includes a coupling mechanism coupling the engine of the vehicle and the driving wheels. The coupling mechanism is activatable between a first and a second state, wherein in the first state the engine and driving wheels are mechanically uncoupled and in the second state the engine is mechanically coupled to the driving wheels. When the driving wheels are rotated by the vehicle or trailer being towed and the engine turned off the coupling mechanism ensures that no parts of the drive train assembly do not rotate and are therefore damaged due to lack of lubrication. Two embodiments are disclosed, one with the coupling (138) in the transfer box (110), and in the second embodiment the coupling is in the wheel hub assembly. Also disclosed is an oil pump assembly driven by the wheels rather than the drive train to provide some lubrication when the wheels are rotating and the engine is off.

10 Claims, 16 Drawing Sheets

DRIVE TRAIN ASSEMBLY FOR USE IN POWERED VEHICLES OR TRAILERS

The present invention relates to a drive train assembly that may be used with powered vehicles, power trailers or slave units. In particular the present invention relates to an assembly that enables the gearbox and the engine of the vehicle or power trailer to be disengaged from the drive train assembly when it is being towed and its engine is not running.

BACKGROUND OF THE INVENTION

Multi-combination vehicles commonly referred to as "road-trains" have been in use for some time, particularly in Australia, for the purpose of hauling freight such as mining ores, or other commodities, over aboveground and even underground roadways. Known road-trains typically include a powered primary load-carrying vehicle such as a wheeled, rigid body truck and one or more load-carrying towed vehicles. The towed vehicle may include a wheeled dolly and a semi-trailer coupled to the dolly. Both the towing and towed vehicles may include load-carrying bodies of the side-tipping type.

In remote areas, it is not unusual for road-trains to include a plurality of trailers. However, even though truck engines of up to a thousand horsepower have been developed, the transmission systems and especially the gearboxes are unable to tolerate large payloads and therefore limit the total payload of a road-train. In addition, when such road-trains have been used in underground mines, there is a lack of traction on larger inclines leading to such road-trains only being able to navigate relatively small inclines.

Due to this problem, powered trailers have been developed by the present applicant and which are the subjects of separate patent applications. These powered trailers in brief rely on an engine on a trailer that provides the additional horsepower and traction for the road-train to carry more payload, consequently saving on operational costs.

However, when the road-train has delivered its load and is being returned empty to collect more payload, it is preferable for the powered trailer to be simply towed. Such a scenario may be warranted where, for example, one is using a dedicated road-train to transport ore from a mine to a processing plant that may be hundreds of kilometers away. Being towed may conserve fuel but may lead to transmission and engine wear and damage. This is because in a powered trailer road-train, even though the engine of the power trailer is not running, the drive wheels still cause the drive train of the powered trailer and hence its gearbox to be rotated. This is undesirable for without the engine running the engine oil pump is not running leading to a lack of lubrication. This not only can damage the transmission and the engine but also any superchargers or turbochargers, these being common accessories in diesel engines.

The inventor is not aware of any known powered trailer drive train where the drive train or the wheel rotation may be disengaged from the gearbox and the engine so that even when the vehicle or trailer wheels are turning the operator has the choice to decouple the engine and transmission.

Most drive trains require a separate oil pump that circulates the oil required for lubrication and heat dispersion for the drive train assembly. Generally this is a pump that is driven by the input shaft. It therefore follows that if the input shaft is decoupled from the drive wheels, when the powered trailer is towed and its engine is not running the oil pump for the drive train assembly is not working even though components of the drive train assembly are still being rotated. This can lead to obvious failure of and damage to the drive train components. The present invention also provides for an embodiment where this problem is overcome.

The oil pump assembly assists in ensuring that the drive train assembly remains lubricated even when the power trailer engine is not running. However, since the gear box has a separate lubrication system, the oil pump assembly does not imply that the decoupling of the drive train is an option when the engine is not running. It is to be clearly understood that when the engine is not running, the drive train assembly must be decoupled regardless of the presence of a separate lubrication system for the drive train assembly. Whether an oil pump assembly is provided also depends on where the decoupling of the drive train assembly occurs. If it occurs within the drive train assembly then additional lubrication is still required. However if it occurs at the wheel hubs then the additional lubrication is not essential.

SUMMARY OF THE INVENTION

Therefore in one form of the invention there is proposed a drive train assembly for use in powered vehicles or trailers having at least one axle of driving wheels, said assembly including a coupling mechanism coupling a source of motive power and the driving wheels, said coupling mechanism activatable between a first and a second state, wherein in the first state said source of motive power and the driving wheels are mechanically uncoupled and in the second state said source of motive power is mechanically coupled to the driving wheels.

Preferably the source of motive power includes a gear box.

In preference the assembly includes an oil pump driven by the driving wheels.

In a further form of the invention there is proposed a drive train assembly for use in powered vehicles or trailers, said drive train assembly adapted to provide power to a wheel assembly and including:

an input shaft having a fixed gear assembly, said input shaft adapted to be rotatably coupled to a source of motive power, said fixed gear assembly rotatable with the input shaft;

a helical drive adapted to rotate about said input shaft and having a first side gear and a second side gear located on opposite sides thereof said first side gear located adjacent said fixed gear assembly;

a drive disconnect gear assembly adapted to rotate about said input shaft and including two gear discs fixed to each other and extending in opposite directions, one said gear disc adapted to engage said second side gear and the other adapted to engage a thru-shaft gear to provide power to a further wheel assembly;

a clutch collar slidable from a first to a second position wherein in the first position said clutch collar engages said fixed gear assembly and wherein in the second position said clutch collar engages both said fixed gear assembly and said first side gear;

wherein when said clutch collar is in the first position the input shaft is decoupled from the wheel assembly; and wherein when in the second position the clutch collar thereby causes any rotational motion of the input shaft and the fixed gear assembly to be transferred to the drive disconnect gear assembly and to the wheel assembly.

Preferably said assembly includes a third driving assembly provided power through the thru shaft gear.

In preference the input shaft is rotatably coupled to a source of motive power through a gear box.

Advantageously the source of motive power is an internal combustion engine.

Advantageously the clutch collar includes a biasing mechanism adapted to keep said collar in said first position.

In preference the biasing mechanism is a spring.

In preference the clutch collar sliding motion is achieved by the use of a solenoid.

In preference the gear discs are substantially identical. This reduces manufacturing and installation time and cost.

Preferably said assembly further includes an oil pump assembly rotationally coupled to said drive wheels to pump oil within the drive assembly independent of the rotation of the input shaft.

In preference the drive wheel assembly further includes a crown wheel and said oil pump includes a drive shaft mechanically coupled to the crown wheel.

In a yet further form of the invention there is proposed a drive train assembly for use in powered vehicles or trailers, said drive train assembly adapted to provide power to a wheel assembly and including:
a brake drum having a wheel removably attached thereto;
an axle bearing housing extending from said brake drum and in fixed relative rotation thereto;
a drive gear, extension housing and piston housing fixedly attached to said axle bearing housing;
an axle extending through and adapted to freely rotate within said brake drum assembly, axle bearing housing, drive gear, extension housing and piston housing and having a stub engaging a detent in said piston housing, said axle further having splines adjacent said stub;
a connecting gear having interior and exterior splines, said connecting gear interior splines engaging said axle splines;
a piston slidably mounted within said piston housing and in contact with said connecting gear, said piston slidable between a first and a second position wherein in said first position said connecting gear is not engaging said drive gear and in said second position said connecting gear engages internal splines of the drive gear; and
wherein when said piston is in said first position said wheel assembly and axle may independently rotate with respect to each other and when said piston is in said second position the axle and the wheel assembly are thereby in fixed rotational orientation and rotation of either the axle or the wheel causes the rotation of the other.

Preferably the piston is slidable by the use of air pressure.

The primary object of the present invention is to therefore decouple the gearbox and the engine of the power trailer from the rest of the drive assembly when the power trailer is being towed. As will be illustrated below, several embodiments of this may be presented. In one embodiment, the disassembly occurs within the drive assembly at the input shaft while in the other it occurs essentially at the wheel hub.

It is a further object of the present invention to provide for a drive train device that can be fitted on existing drive trains with minimal modification.

The present invention therefore provides for a drive train assembly for use in a powered trailer that can be used to disengage its drive train from that of the transmission and the engine. It is however to be understood that the present invention is not intended to be limited to powered trailers and may equally well be used on self-propelled vehicles including trucks and boats where when such a vehicle breaks down and needs to be towed by another vehicle one wishes to minimise damage to the gearbox.

It will also be appreciated that most drive trains include an oil pump that is driven by the input shaft. If the input shaft is not rotating the oil pump does not operate causing lack of lubrication even while the rest of the drive train is still rotating. This problem is overcome by the inclusion of an oil pump that is driven directly from the drive wheels. The present invention therefore also provides for an oil pump assembly that may be fitted to existing drive trains with minimal modification. In one embodiment the oil pump is driven by rotational motion provided from the drive wheels rather than from the input shaft of the drive train assembly.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DETAILED DESCRIPTION

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
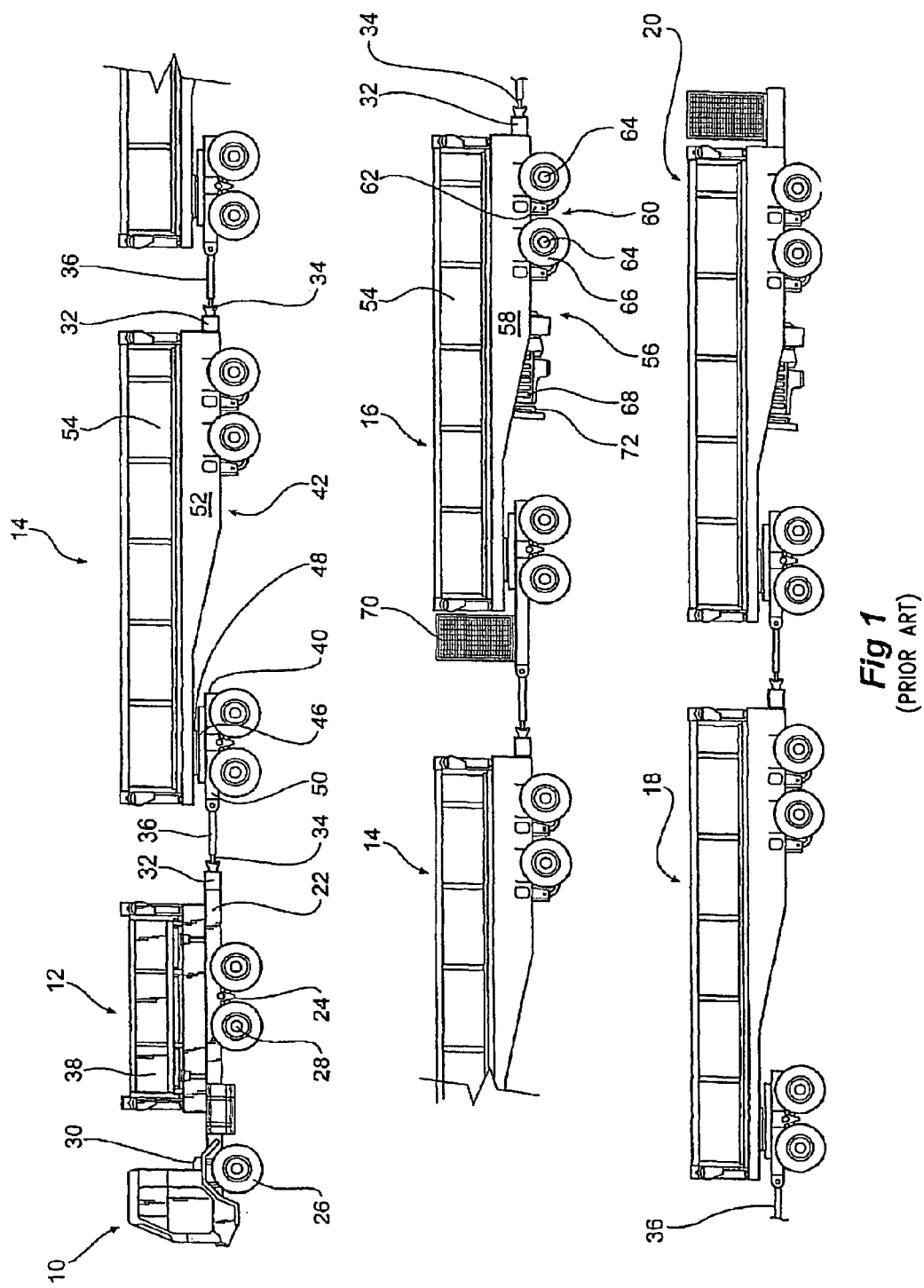
FIG. 1 is a schematic illustration of a road-train incorporating a prime mover, a plurality of trailers and at least one power trailer.

Illustrated in FIG. 1 is a road train or multi-combination vehicle 10 including a prime mover 12 mechanically coupled to a plurality of trailers 14. A power trailer 16 extends from forwardly located trailers 14 and a further trailer 18 is coupled to the power trailer 16. A second power trailer 20 is coupled to the last trailer 18. It is however to be understood that the multi-vehicle combination may be one or more power trailers, depending on the application.

The prime mover 12 includes a chassis or frame 22 and a rear axle assembly 24, which is suspended from and disposed below the chassis 22. Forward axle 26 comprises the steering axle of the prime mover 12. The rear axle assembly is suspended from chassis 22 via an air suspension (not shown) and includes wheeled axles 28. Both of the wheeled axles may be driving axles, or alternatively only one is a driven axle. The driving axles may be a tridem axle assembly in lieu of the tandem axle assembly 28 and possibly suspended with a mechanical suspension.

The prime mover 12 further includes a motive power source 30 and a transmission (not shown) for transmitting torque from the motive power source 30 to the drive axles 28. Typically the source of motive power comprises a diesel engine and the transmission for transmitting torque from the engine 30 to the drive axles 28 includes a gear box, a drive shaft and differential (not shown). Alternatively, the source of the motive power 30 may comprise other types of internal combustion engines utilizing a variety of fuels. Yet another alternative the source of motive power 30 may comprise an electric motor with the transmission for transmitting torque comprising a suitable coupling interconnecting the electric motor and axle assembly 22.

The prime mover further includes a draw frame 32 attached and rearwardly extending from the chassis 22. A coupling 34 is attached to the rear of the draw frame 32 and connected with a drawbar 36 on the trailer. A bin 38 accommodates payload to be carried by the prime mover and may be adapted to be side tipping by hingedly attached to the frame 22 (not shown). Each of the trailers 14 includes a converter dolly 40 and a semi-trailer 42, having a forward end with a coupling system 46 that pivotably attaches to a ball-race turntable 48 on the converter dolly. This enables the converter dolly to pivot relative to the semi-trailer about a generally vertical axis of rotation passing though the centre of the ball-race turntable. Other embodiments may however equally well be used, such as an oscillating ball-race turntable. The drawbar is hingedly connected to the chassis 50 of the converter dolly 40 and accommodates for any change in the grade of the road surface. As with the prime mover, the trailer further includes a draw frame 32 attached and rearwardly extending from the chassis 52 of the semi-trailer 42. A coupling 34 is attached to the rear of the draw frame 32 and is connected with a drawbar 36 on the next trailer or power trailer. A bin 54 accommodates payload to be carried by the trailer and may be adapted to be side tipping by hingedly attached to the frame 52 (not shown).

The semi-trailer 56 of the power trailer 16 includes a chassis or frame 58 which may include a pail of longitudinally extending side member (not shown) and a plurality of transverse cross-members (not shown) interconnecting and attached to the side members. The semi-trailer 56 includes a rear axle assembly 60 that is suspended from chassis 58 by air suspension 62. Alternatively the semi trailer 56 may include conventional mechanical spring assembly. The side members support or form part of the load carrying structure such as bin 54. The load carrying structure may be a side tipping trailer, a stock crate, a fuel tank, or another type of structure for supporting a load. As with the prime mover and the trailer, the power trailer further includes a draw frame 32 attached and rearwardly extending form the chassis 58. Coupling 34 is attached to the rear of the draw frame 32 and connected with a drawbar 36 on the next trailer or power trailer. A bin 54 accommodates payload to be carried by the trailer and may be adapted to be side tipping by hingedly attached to the frame 58 (not shown).

The rear axle wheel assembly 60 includes tandem wheeled axles 64. In an alternative the axle assembly may be a tridem assembly in lieu of the tandem axle assembly. The wheeled axles include a plurality of tyres 66 mounted thereon for supporting the semi-trailer as it travels over a road surface.

Mounted below the upper surface of the chassis 58 is a motive power source or engine 68 positioned generally centrally between the chassis. A transmission (not shown) provides driving power from the engine to the axle assembly 60 where one or more of the wheeled axles 64 may be driven. The engine is typically a diesel engine and may advantageously include a turbocharger (not shown). To be able to fit the engine in between the chassis, the spatial distance between the two is generally larger than that conventionally found on existing semi-trailers. However, the standard width of the wheeled axles had to be kept the same to keep the vehicle roadworthy.

The engine 68 includes a radiator 70 that is typically at the front of the engine but as illustrated in FIG. 1 is preferably mounted either at the front or rear of the power trailer and is used in cooling the engine by typical fluid means. The turbocharger may include an air-cooling unit 72 that assists in cooling the air that is then injected into the engine. In a conventional cooling system the radiator and air cooler are mounted at the front of the vehicle, which is not desirable in the power trailer.

Figure 2:
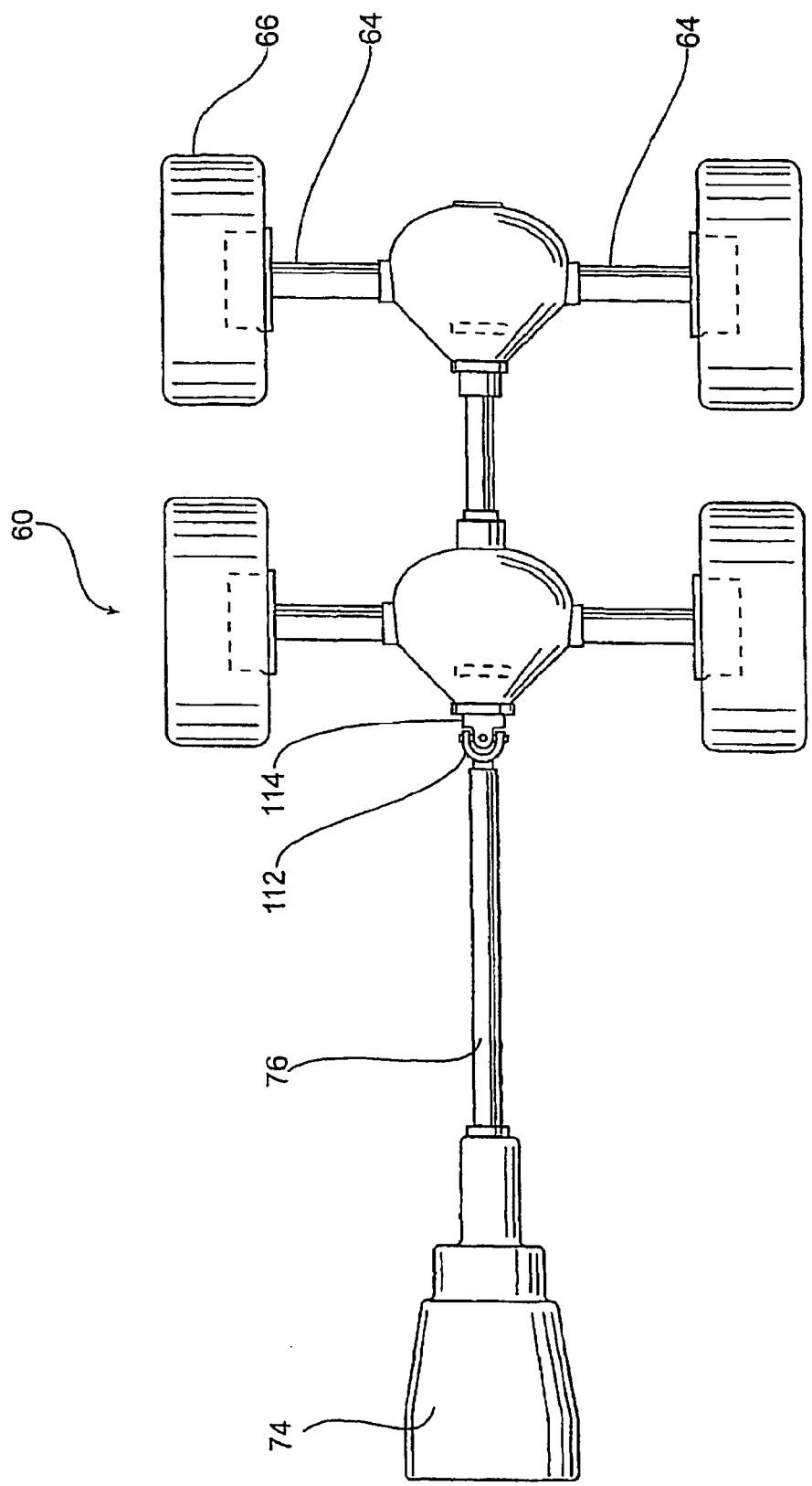
FIG. 2 is a schematic illustration of the drive train assembly of a prime mover or power trailer.

A schematic representation of the drive train assembly of the power trailer is illustrated in FIG. 2. In short, power from the engine is fed to the rear drive train assembly through transmission 74 and drive shaft 76 that engages yoke 112 engaging input shaft 114.

One can therefore appreciate that the engine provides rotational power driving the driving wheels through the drive train assembly. In the same way if the power trailer is being towed, the rotating wheels cause rotation of the drive train assembly and hence the engine through the gearbox. Even if the gearbox is decoupled from the engine the gearbox is still being rotated. Those skilled in the art will immediately appreciate that this may damage the gearbox and for that reason it is essential that there be a decoupling of the gearbox to the driven wheels. As discussed below this can occur within the drive train assembly or at the wheel hubs.

Figure 3:
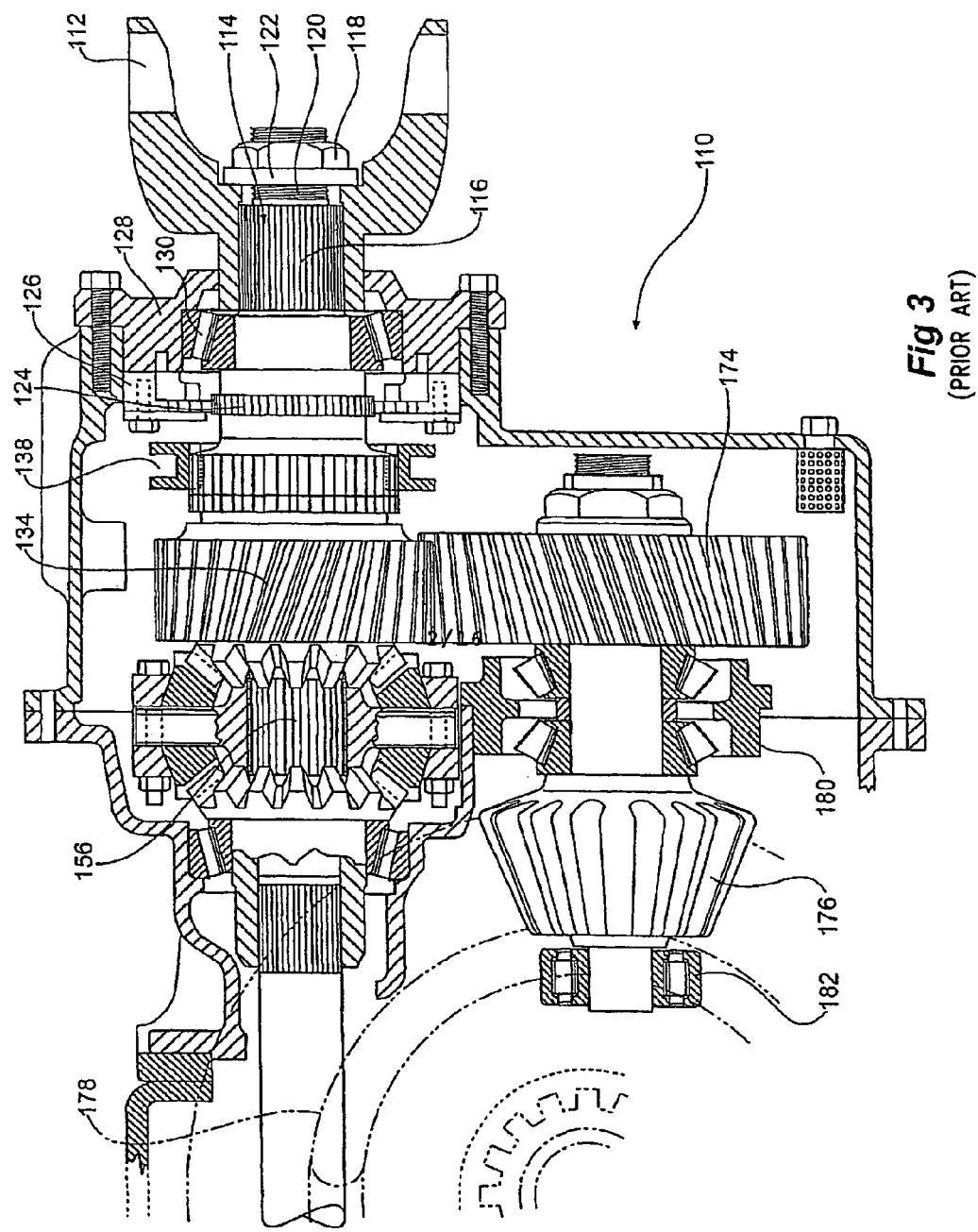
FIG. 3 is a side elevation view, partially in cross-section, illustrating a drive train assembly that is currently used in vehicles.
Figure 4:
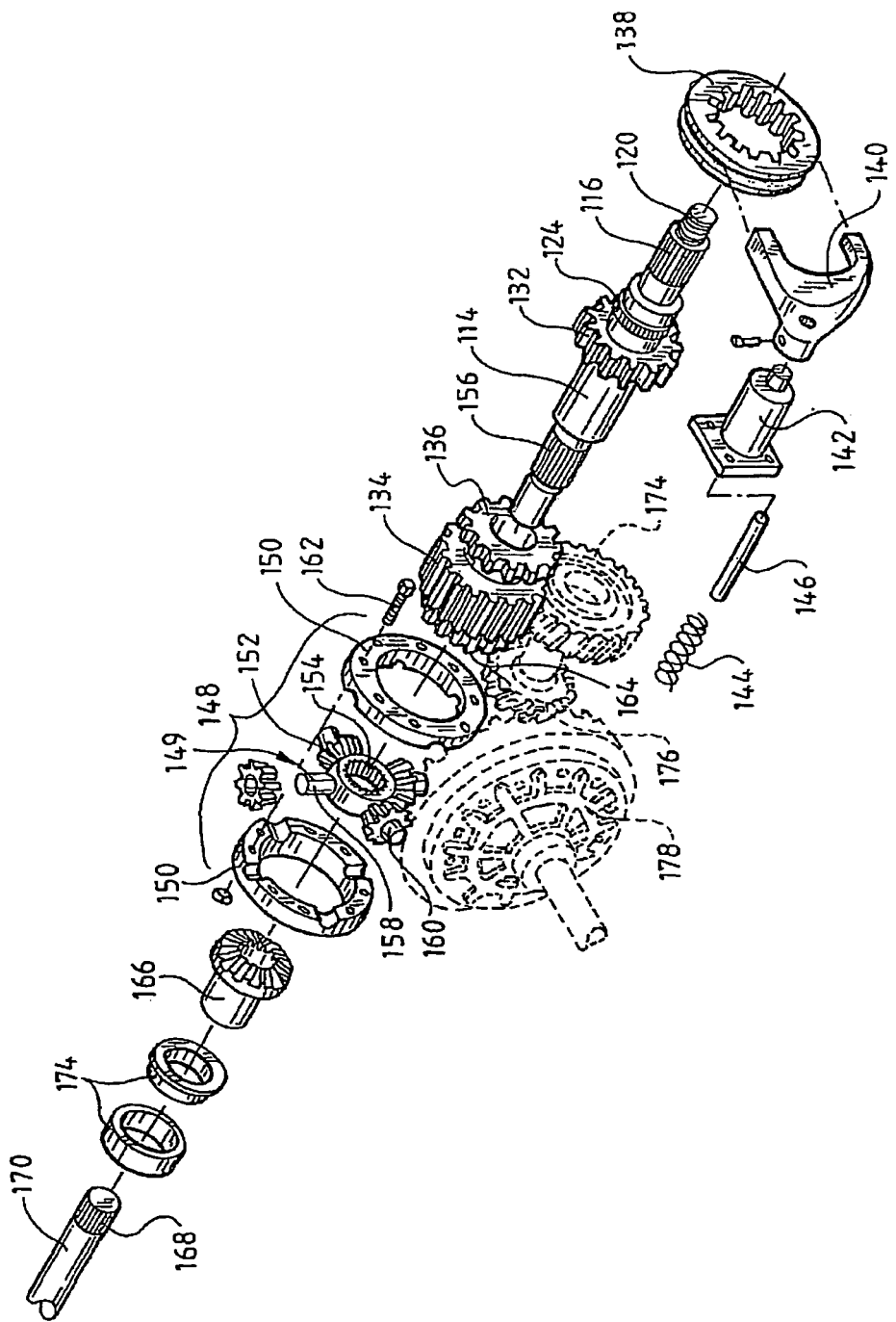
FIG. 4 is a perspective exploded view detailing the separate components of the drive train assembly of FIG. 3.

Illustrated in FIGS. 3 and 4 are drive assemblies currently used in coupling an engine in a truck to the driving wheels whereas FIGS. 5 to 9 illustrate a first embodiment of the present invention.

Referring specifically to FIGS. 3 and 4 there is shown a known drive train assembly 100 including a yoke 112 engaging an input shaft 114 by engaging first splines 116 and held in place by the use of nut 118 engaging threads 120, washer 122 disposed between the nut and the end of the input shaft. The input shaft 114 includes second splines 124 adapted to drive an oil pump assembly 126 that distributes oil within the drive train assembly 110. Positioned next to the oil pump assembly is a bearing cage 128 including cone bearings 130. Although not shown the yoke 112 is connected to the transmission system of a vehicle that in turn is connected to the engine.

The input shaft 114 includes a gear wheel 132. Rotatably mounted on the input shaft is helical drive 134 and forward side gear 136 (also known as spline coupling) that is of the same configuration as the gear wheel 132. Clutch collar 138 is adapted to slidably move along the input shaft from a first position to a second position, in the first position engaging gear wheel 132 and in the second position engaging both gear wheel 132 and forward side gear 136 thus locking the helical drive 134 and forward side gear 136 into rotation with the input shaft 114.

The clutch divides the power across the drive wheels as subsequently discussed. In short, it locks all the wheels together so that they all receive the same amount of power. This assists when one of the wheels may be slipping and ensures that the non-slipping wheels are still provided power.

The clutch collar is slidable by the use of a shift fork 140 that is controlled by the use of air pressure cylinder 142 including spring 144 mounted on rod 146. When under pressure, the clutch collar slides across the input shaft to engage both the gear wheel 132 and forward side gear 136 with the pressure being such to overcome the force due to the spring 144. With no air pressure the spring is chosen to be sufficiently strong to push the clutch collar off the forward side gear 136 and disengage the helical drive from the input shaft. It is to be understood though that instead of air pressure, the clutch collar could equally well be operated by other means, such as hydraulic pressure or alternatively by the use of electro-mechanical means such as a solenoid.

The operation of the clutch collar may be controlled by appropriate electronic or mechanical means. Generally one may expect that an operator would be able to electrically control the operation of the clutch collar from their cabin.

A power divider nest assembly 148 includes two inter-axle differential cases 150 mounted on either side of an inter-axle pinion gear 149. The pinion gear 149 includes an internal bore having third splines 152 that engage fourth splines 154 on the input shaft 114. The differential cases 150 include grooves 156 that engage rods 158 (also known as the cross) on the pinion gear. Pinions 160 rotate about said rods 158, nuts and bolts 162 clamping the cases 150 and pinion gears 149 in fixed relative position.

The pinions 160 engage on one side the rear side gear 164 and on the opposite side inter-axle side gear or thru-shaft gear 166. The rear side gear may be integral with the helical drive 134. The thru-shaft gear 166 includes internal splines (not shown) that engage fifth splines 168 on inter-axle or jackshaft 170 that provides power to the rear drive axle 172. Gear bearings 174 are also located adjacent thru shaft gear 166.

During normal operation of the truck and power trailer, for example when hauling a load and the power trailer engine is running, the clutch collar is not engaged wherein the input shaft rotates the pinion gear assembly and wherein the pinion gears rotates the thru-shaft gear 166 and the rear side gear 164 that then provide power to the wheels through driven helical gear 174, drive gear pinion 176 and crown wheel 178. The driven helical gear 174 and drive gear pinion 176 are held in place by the use of nut-drive pinion 179. Pinion bearing cage 180 and drive pinion bearings 182 also allow for rotation of these gears.

In operation if none of the drive wheels experience slippage then power is provided to both the forward drive wheel assembly 184 and rear drive wheel assembly 186 through the pinion gear assembly 148. If however, either the forward or the rear drive wheel assemblies experience slippage, then the pinion gear assembly causes those wheels to slip and for the other drive wheel assembly to lose power. Under such circumstances the operator can then engage the clutch collar that causes the rear side gear 164 to be driven though the input shaft 114 and which then locks all the wheels into a power mode where power is divided across all the drive wheels.

Since the input shaft causes either all or some of the wheels to be driven it follows that if the wheels are rotating so is the input shaft and the yoke that in turn then rotates the automatic transmission. If the engine is powered then this is not a problem, but if the engine is turned off then one can see that this causes a serious problem in that the transmission may be irrevocably damaged due to lack of lubrication and being driven rather than providing the driving. Conventional engines and transmissions systems do not need to concern themselves with this issue since the only time that the wheels are rotating the engine is running. This is also one of the reasons why a number of vehicle manufacturers specify that if a vehicle breaks down there is a maximum distance that the vehicle may be towed before damage can occur to the transmission system. Further still, in the case of a truck or prime mover, seldom is a truck going to be in motion unless under its own power and if being towed it would be for short distances. However in the case of a power trailer, as discussed above it may be advantageous to have the powered trailer towed for large distances without its own engine running.

Figure 6:
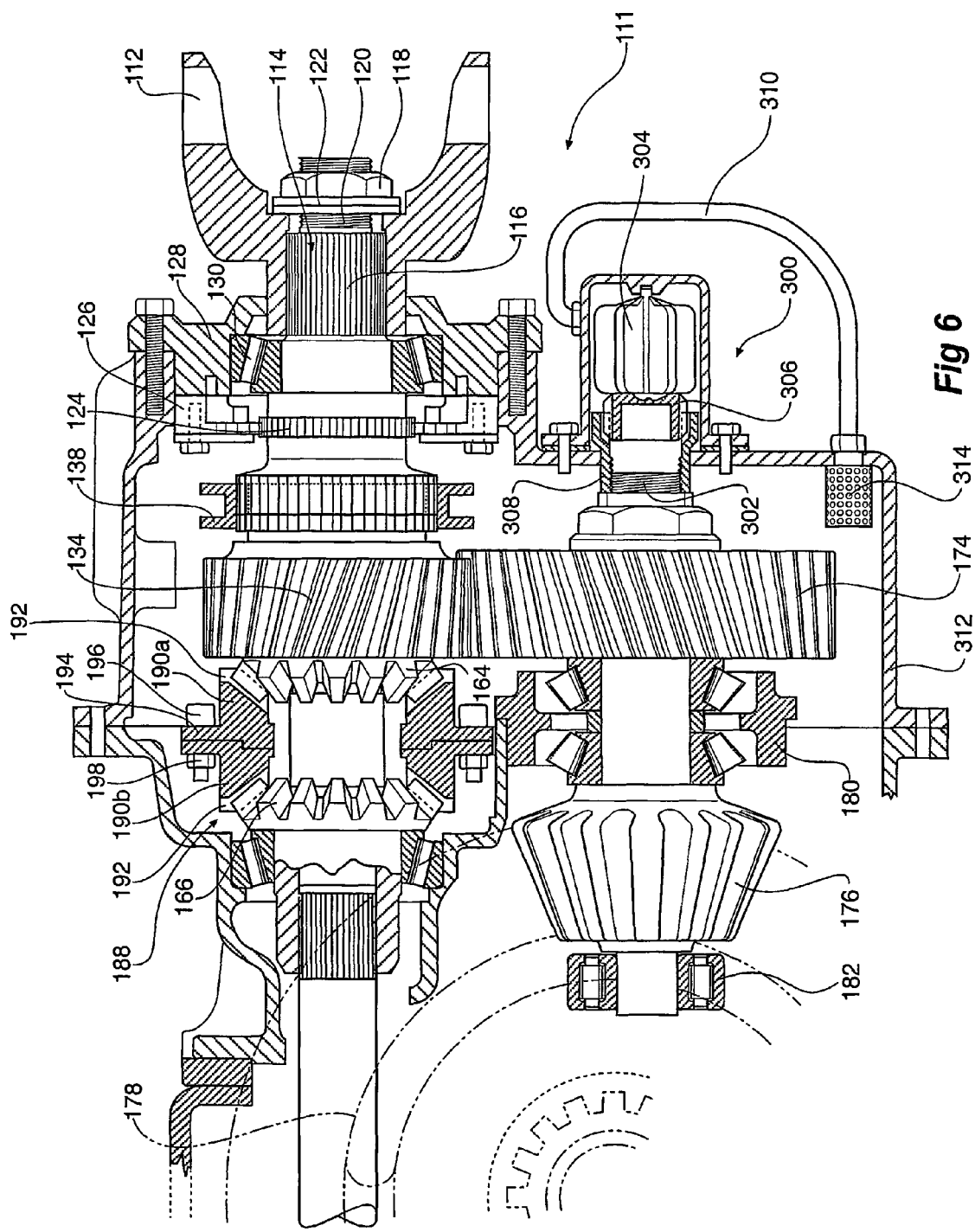
FIG. 6 is a side elevation view, partially in cross-section, illustrating the drive train assembly of FIG. 3 when the drive train assembly is engaged.
Figure 7:
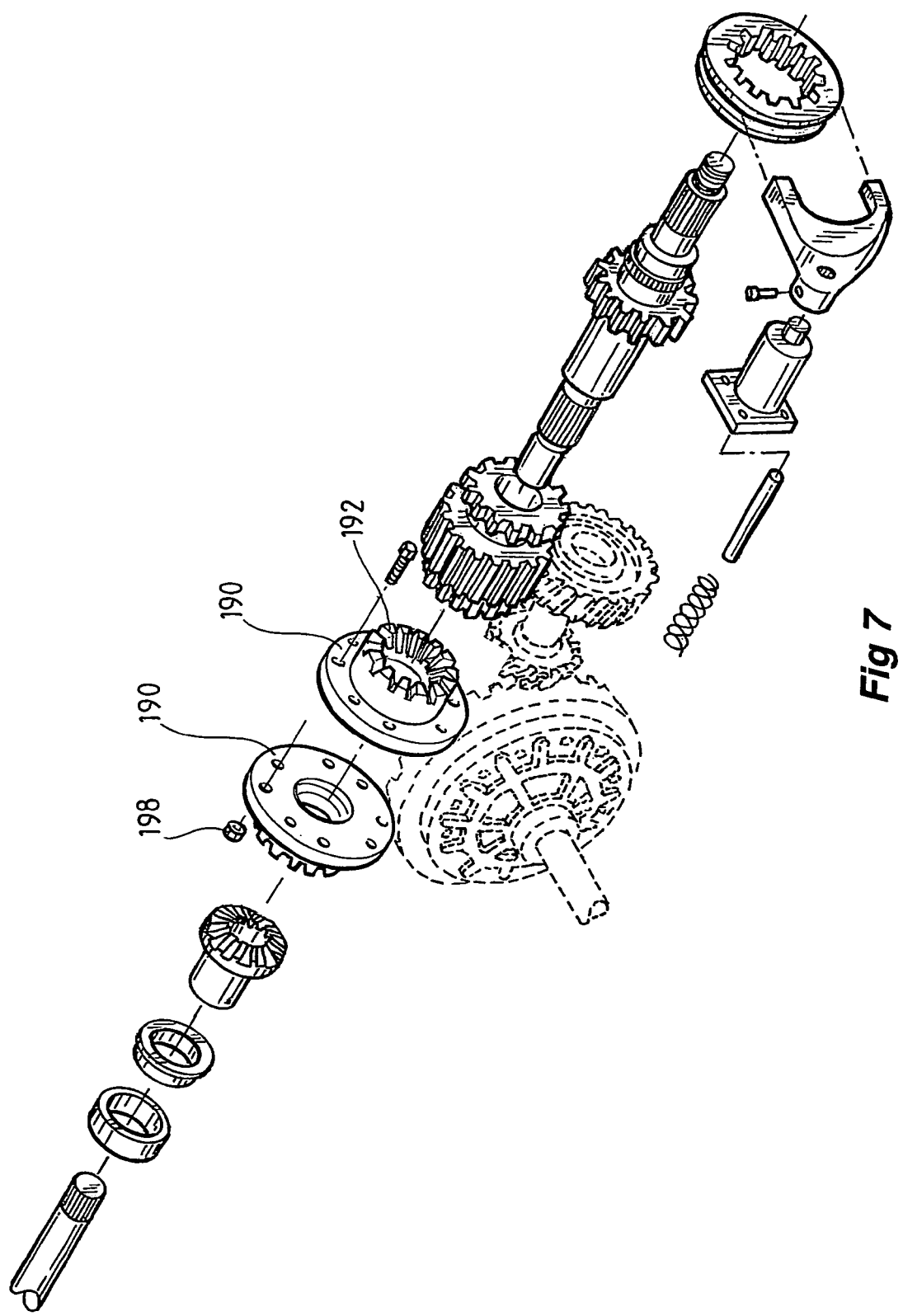
FIG. 7 is a perspective exploded view of the drive train assembly of FIG. 5 detailing the separate components.
Figure 8:
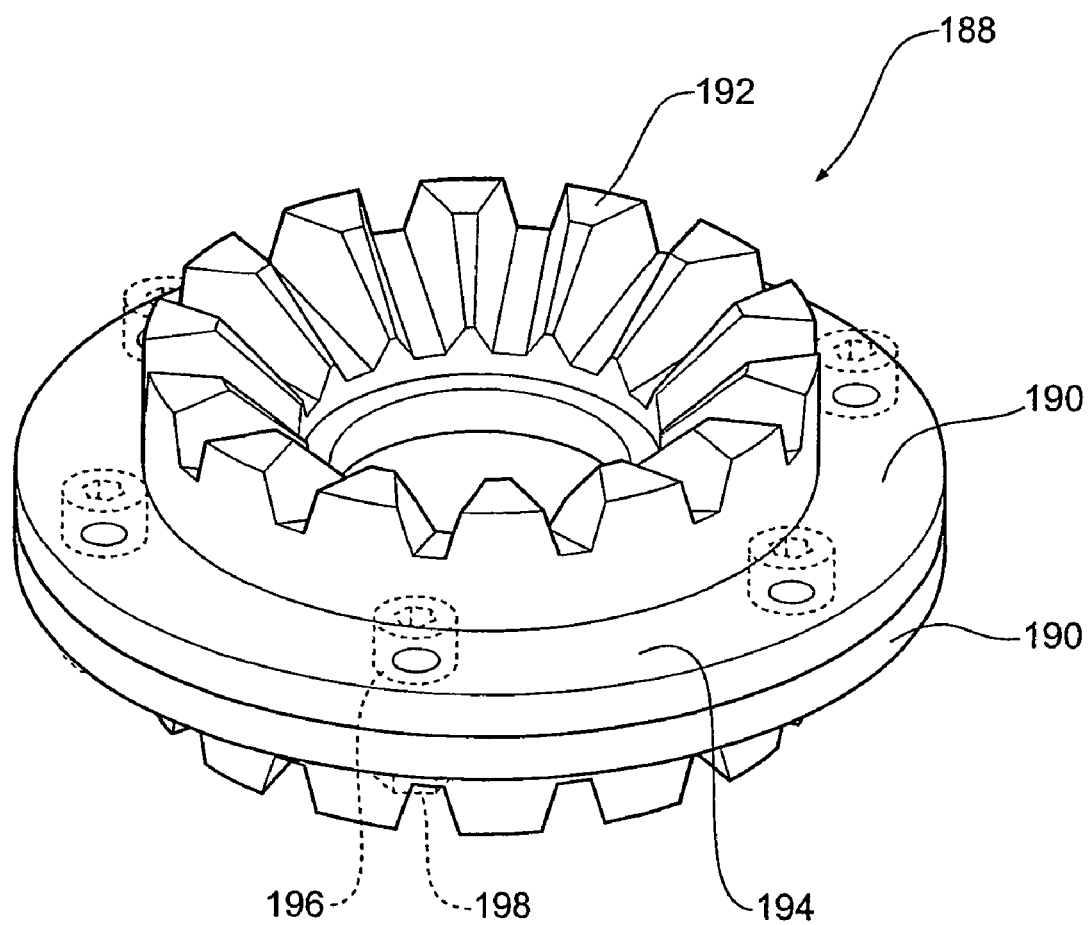
FIG. 8 is a perspective view detailing the drive disconnect gear of the first embodiment of the present invention.
Figure 9:
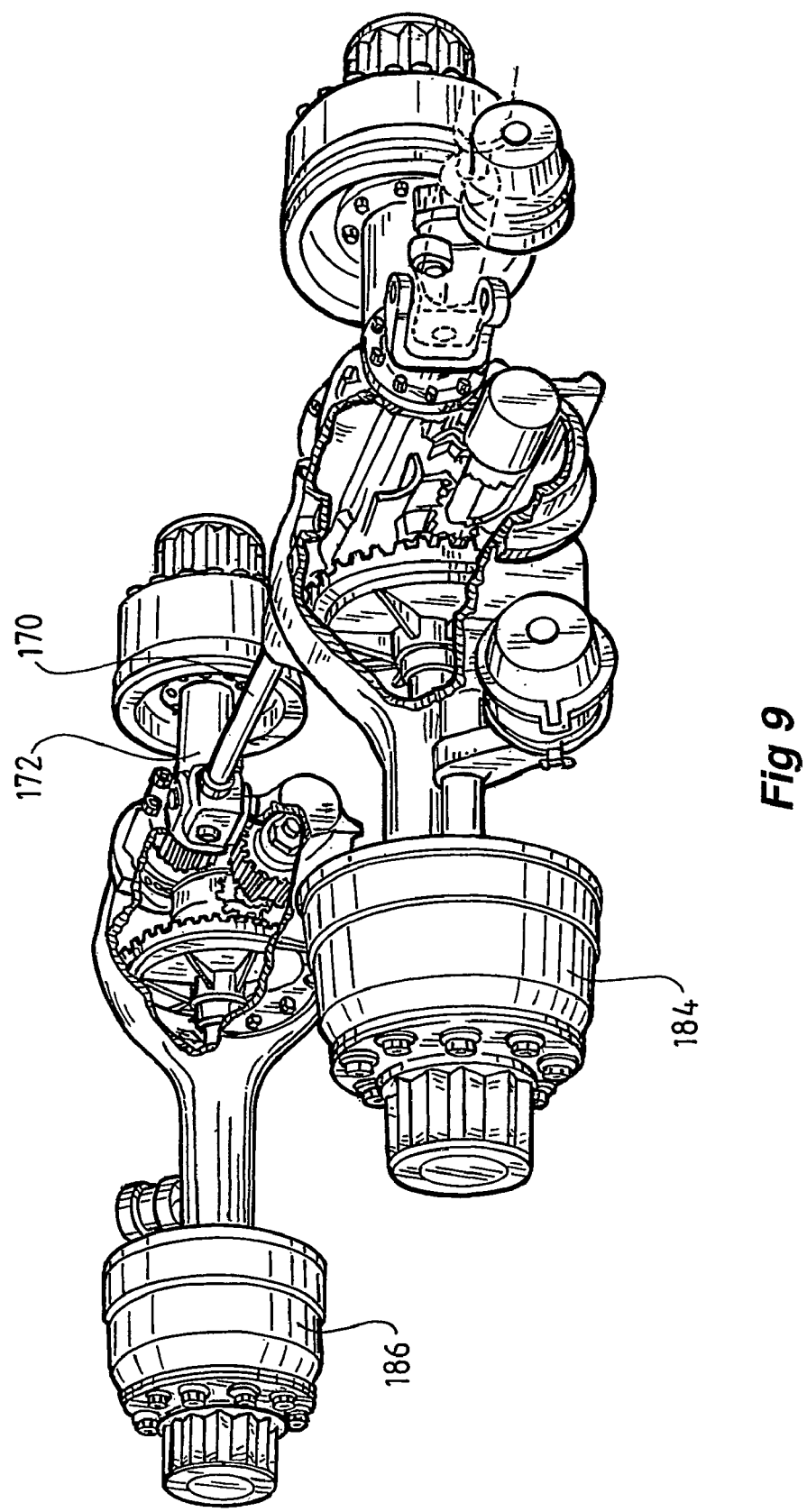
FIG. 9 is a perspective view of the rear drive axles of a powered trailer showing the first embodiment of the drive train assembly.
Figure 10:
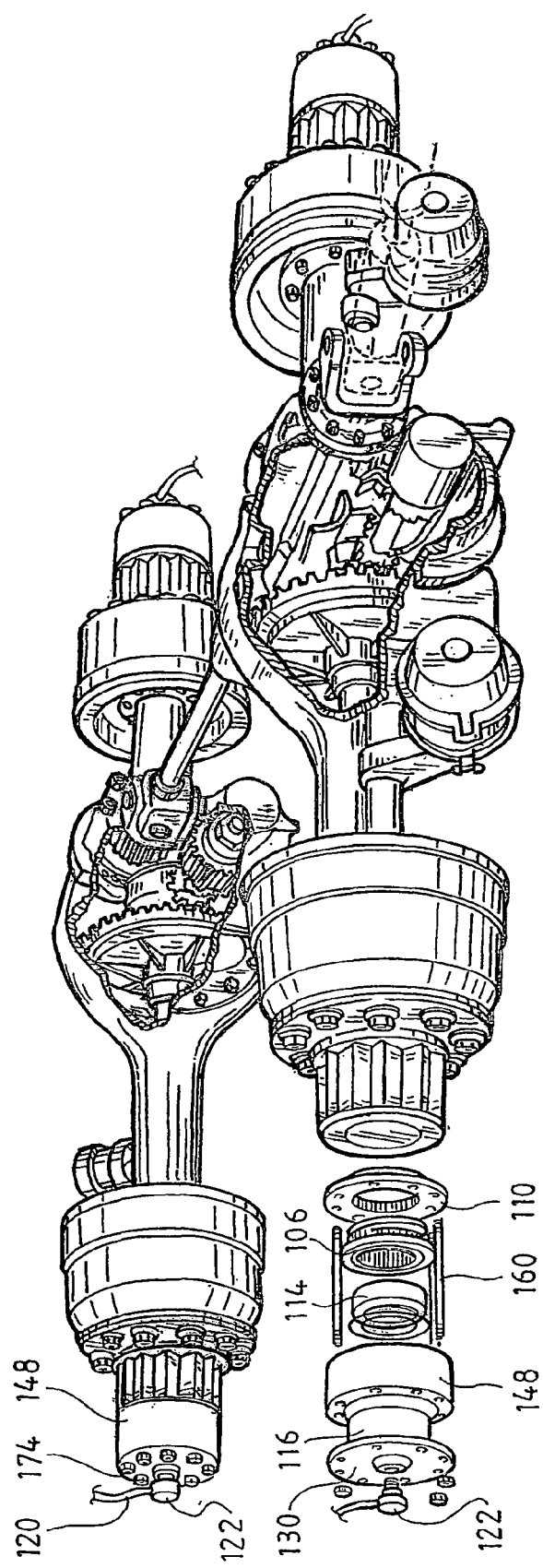
FIG. 10 is a perspective view of the rear drive axles of the powered trailer illustrating a second embodiment of the present invention when the drive disconnect occurs through at least one wheel axle.

Accordingly the present invention seeks to overcome this disadvantage by providing for a drive train assembly 111 where the power divider assembly 148 is replaced with a drive disconnect gear assembly 188 illustrated in FIG. 6. The drive train assembly 111 is generally the same as the drive train assembly 110 with the different components discussed below.

The drive disconnect gear assembly 188 is further unique in that it not only enables the input shaft to be ultimately disengaged from the drive wheels but that it can be mounted on existing drive trains thus overcoming the need to replace the whole drive train assembly and rather simply modify existing ones. This can be achieved since the drive disconnect gear assembly is the same general size and shape as the power divider assembly.

Referring now specifically to FIGS. 5–9 there is thus shown a drive train assembly according to the present invention wherein the power divider nest assembly is replaced by a drive disconnect gear assembly 188 including two substantially identical gear discs 190a and 190b placed back to back and having teeth 192 and a flange 194 wherein bolts 196 pass through the respective flanges of the two gear halves to fixedly join them together by the use of nuts 198 engaging said bolts. Those skilled in the art will however appreciate that the gear discs 190a and 190b do not have to be of the same shape if they have identical teeth 192. However, obviously there are advantages in having the tow being the same configuration such as manufacturing and installation as well as balancing of the discs, important when they are rotating.

The teeth 192 of one of the discs engage the rear side gear 164, the other disc engages the thru-shaft gear 166. The drive disconnect gear assembly does not engage the fourth splines 156 on the input shaft which is therefore no longer required. However in most cases, being a disposable item and so as to avoid the need for replacement, the input shaft would still include those splines.

Figure 5:
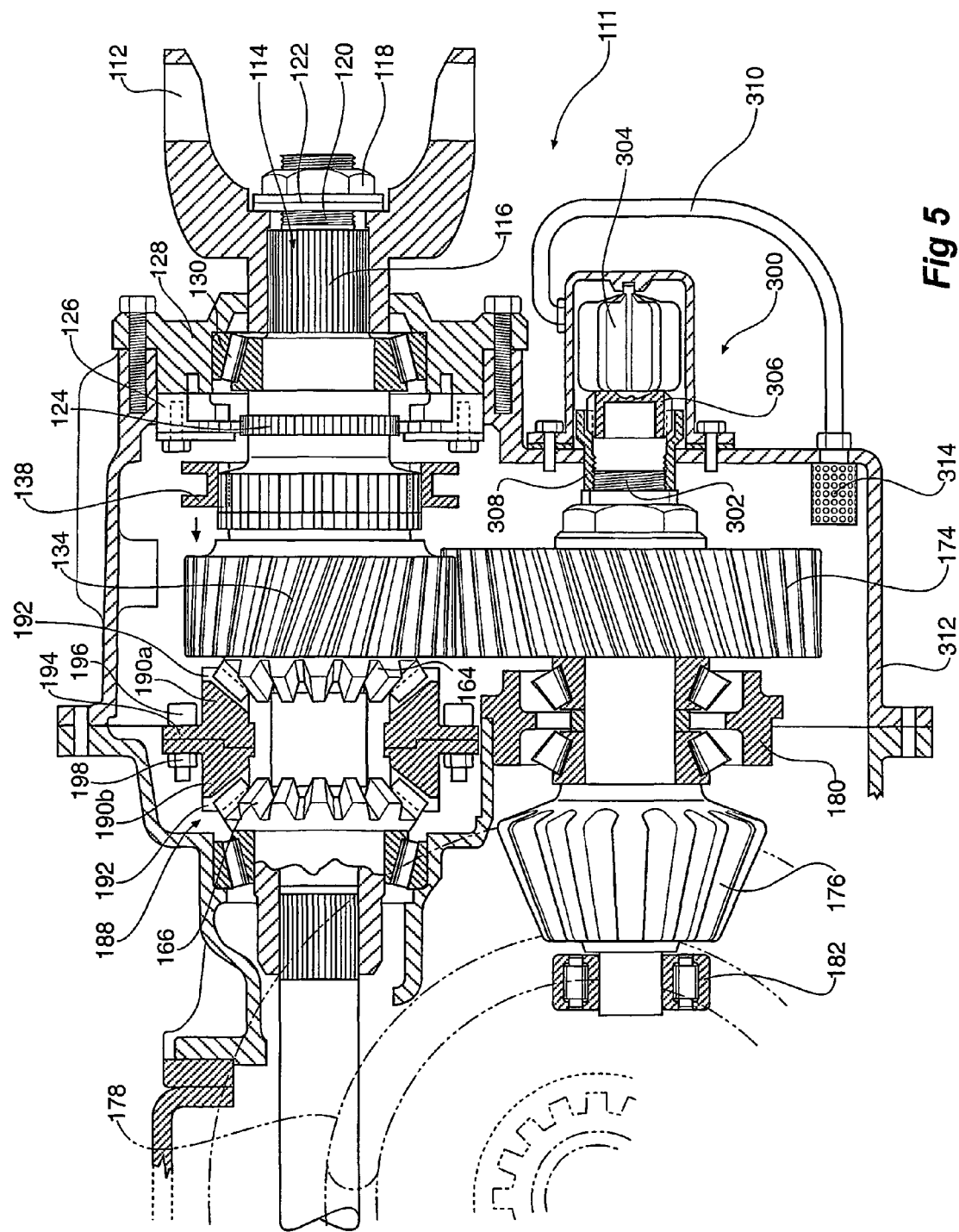
FIG. 5 is a side elevation view, partially in cross-section, illustrating a first embodiment of drive train assembly according to the present invention when the drive train assembly is dis-engaged.

Accordingly power is provided to the drive wheel assemblies through the helical drive 134 and the rear side gear 164. The helical drive 134 is itself rotated by the forward side gear 136 that therefore is only driven when the clutch collar assembly slides across both the gear wheel 132 and the forward side gear 136. FIG. 5 illustrates the drive train assembly when the clutch collar 138 has not engaged the forward side gear 136. FIG. 6 illustrates the drive train assembly when the clutch collar 138 has engaged the forward side gear 136.

It will thus become apparent to the reader that when the clutch collar does not engage the forward side gear 136, the wheels are not directly driven. Consequently, the wheels can spin freely without rotating the input shaft that is connected to the gears and accordingly to the engine through the transmission. In this way when the power trailer is towed, the wheels are decoupled from the transmission and the engine.

In the case of a power trailer, when the operator wishes to utilise the engine of the trailer to propel the power trailer, as would usually be the case when transporting a payload, the clutch collar is engaged causing power to be provided to the drive wheel assemblies. If however, the operator simply wishes to tow the power trailer, the clutch collar is disengaged whereupon even when the wheels are caused to rotate the rotational motion is not transferred to the input shaft therefore protecting the transmission.

As a safety precaution, a control means may be provided wherein said clutch assembly cannot engage the forward side gear unless the power trailer engine is running. Similarly there may well be provided an indicator means to indicate to the operator if the clutch collar is in the first or second position.

Illustrated in FIGS. 10–14 is a second embodiment of the present invention wherein the drive train assembly is decoupled from the engine at the wheel hub. The disconnection therefore need not occur within the drive train assembly itself but rather at the wheel hub. It is to be understood that it can occur at each of the wheel hubs that is driven, in the Figures there being shown four such wheels.

The modification involves extending the wheeled axle 64 to create a longer axle 200. The axle 200 includes splines 202 that engage inside splines 204 of a connecting gear 206. The connecting gear further includes external splines 208 adapted to engage drive gear 210 that has internal splines 212. The connecting gear can be slidably moved to engage and disengage the drive gear. This sliding motion is achieved by the use of a piston 214 that is housed in piston housing 216. The piston housing includes an internal cavity 218.

An airline 220 having an end connector 222 is adapted to engage nozzle 224. O-rings 226 ensure that there is a good seal between the connector and the nozzle. The nozzle 224 includes a male threaded end 228 adapted to be screwed into end plate 230 of the piston housing that includes a correspondingly threaded female bore 232. Air then flows through the airline 220, nozzle 224 into cavity 218, through air passageways 234.

By using an air pressure source that is generally commonly available on large transport vehicles, the cavity 218 can be pressurised. O-Rings 236 ensure that the cavity is airtight. Any air pressure therefore causes the piston to slide outwardly from the housing. Connected to the piston 214 through thrust bearings 238 is the connecting gear 206. Those skilled in the art will appreciate that as the piston moves slidably outwardly so does the connecting gear causing it to engage the drive gear.

Biasing spring 240 ensures that when the air pressure is reduced, the piston and the connecting gear are caused to move slidably back towards the piston housing thereby disconnecting the connecting gear with the drive gear. One end 242 of the spring is fixedly attached to the drive gear, the other end 244 rotatably fixed to the connecting gear 206 via thrust bearings 246. This enables relative rotation between the connecting and the drive gears. It will however be appreciated that other ways of effecting biasing may be used instead of a spring.

Extension housing 248 covers the piston housing. It includes an inner wall 250 and an outer wall 252, the walls held together by a disk 254 on at least one end, said disk having a plurality of disk apertures 256. These disk apertures 256 align with apertures 258 in the end plate 230. Both the disk and the end plate apertures are of a corresponding size, shape, and number and are adapted to allow studs 260 to pass therethrough. Similarly drive gear 210 also includes the same number of apertures 262 located on flange 264 that are suitably dimensioned and positioned so that the end plate 230, extension housing 248 and the drive gear 210 may be relatively rotated with respect to each other to allow the studs to extend through apertures 258, 256 and 262 respectively.

The ends of the studs are externally threaded. With the studs extending through the end plate, piston housing, and drive gear, one end 266 is screwed into correspondingly threaded bores 268 of the axle bearing housing 270. The length of each stud is such that when it has been screwed into the axle bearing housing, its other end 272 protrudes beyond the end plate 230. Threaded nuts 274 can then secure the studs in position, with washers 276 assisting to keep the nuts screwed on.

Located in the end plate is a grub screw 278 that can be removed. Removal of the grub screw connects the passageway 234 to the outside. This assists in cleaning out the passageway or releasing the air pressure and thus disengaging the piston if required.

The axle includes a stub 280 that is supported within detent 282 of the piston housing. Bearings 284 allow the stub to rotate with respect to the piston housing.

Whilst the above-described arrangement extends the wheel axle, its length is still such that a tyre is attached to the standard brake drum 286 by the use of wheel bolts 288. The brake drum is rotatably fixed with respect to the axle bearing housing 270.

Figure 11:
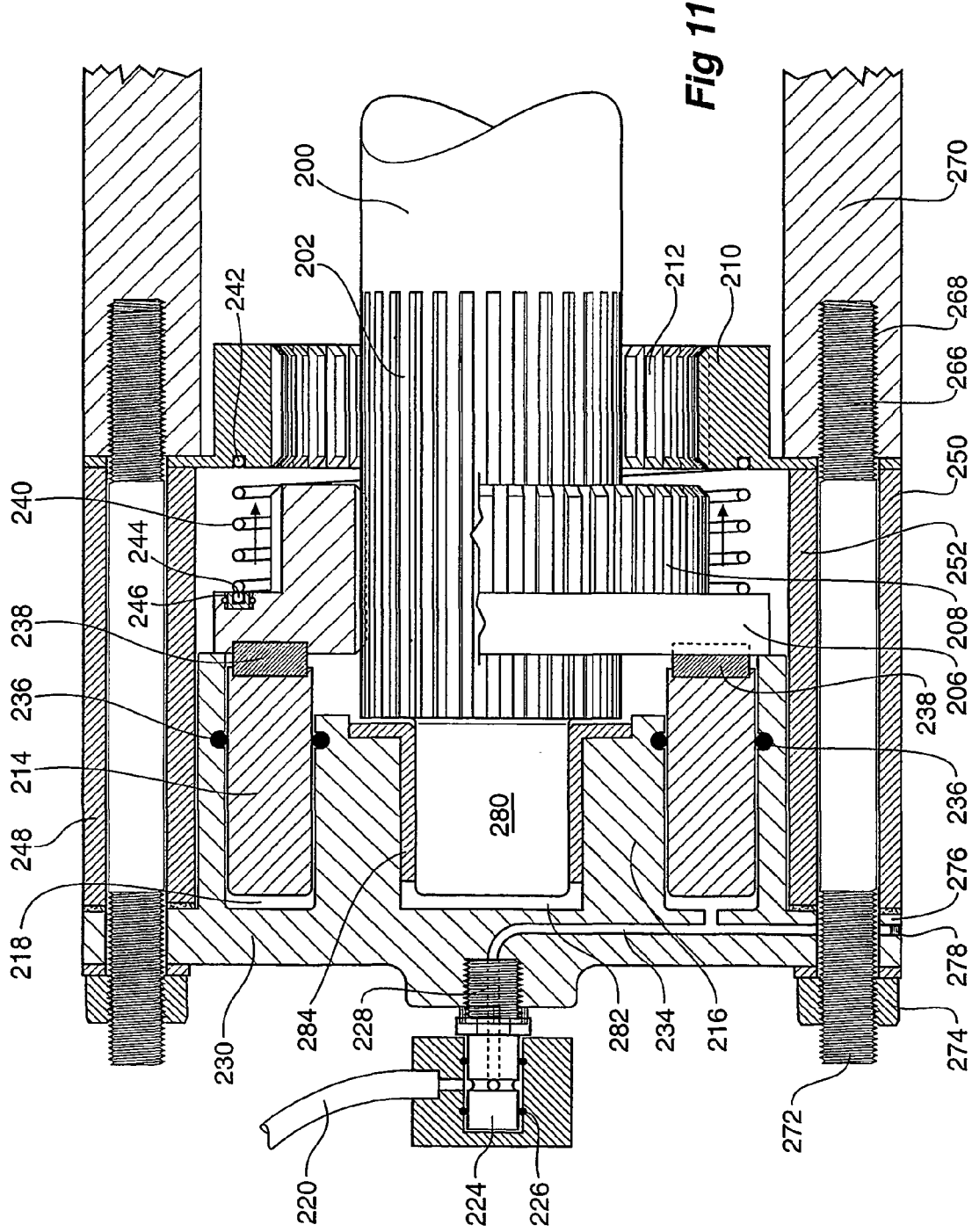
FIG. 11 illustrates a cross-sectional view of the second embodiment of the present invention and in particular the wheel hub assembly when in a disengaged position.

One can therefore appreciate rotation of the wheel causes the brake drum and the axle bearing house to rotate in unison with the wheel. The extension housing, the piston housing and the drive gear are rotatably fixed with respect to the axle bearing housing and are rotated. When the piston has not been slidably moved by the use of air pressure, as illustrated in FIG. 11, there is nothing connecting the drive gear to the axle and therefore the axle is not rotated.

Figure 12:
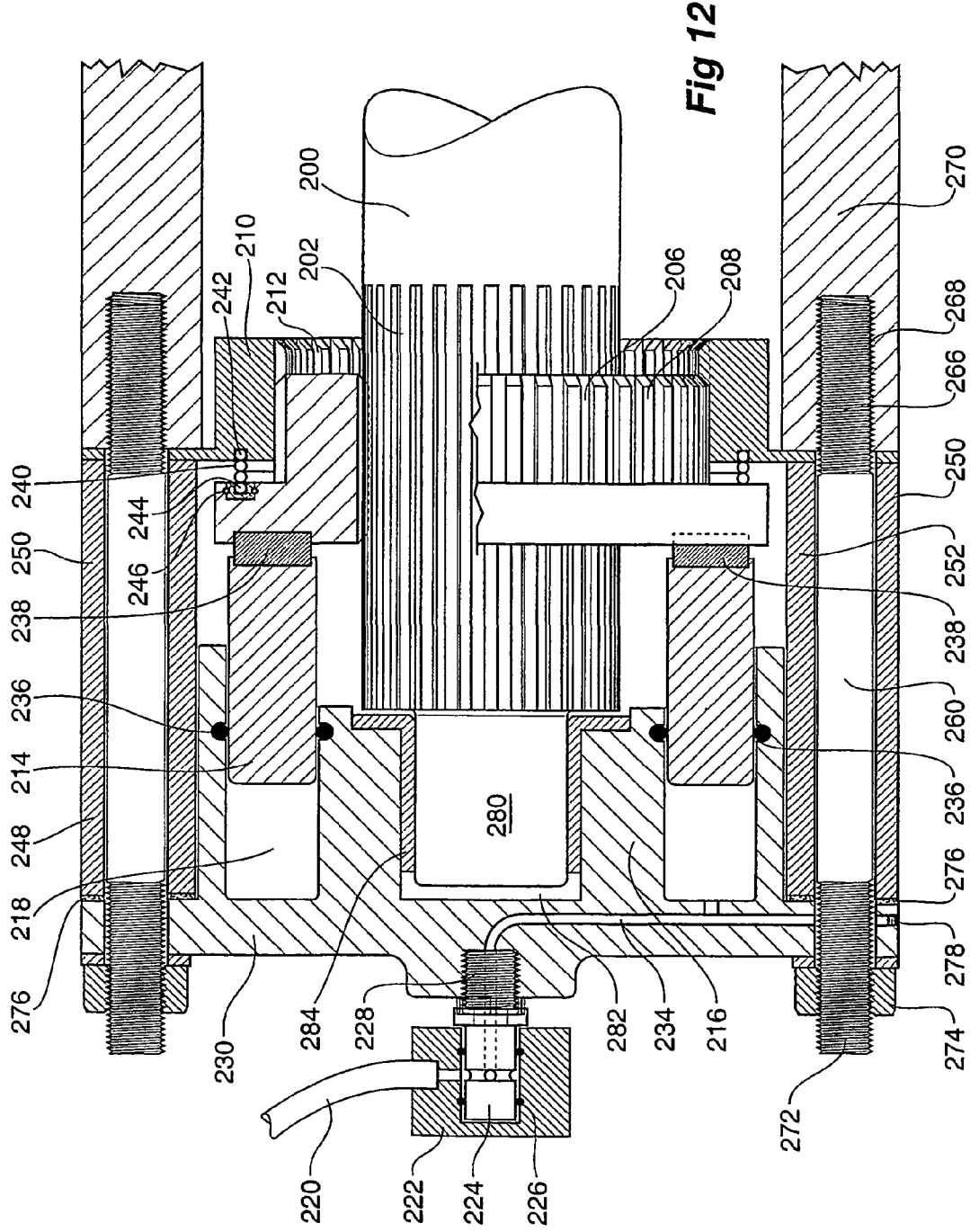
FIG. 12 illustrates the wheel hub assembly of FIG. 11 when in the engaged position.
Figure 13:
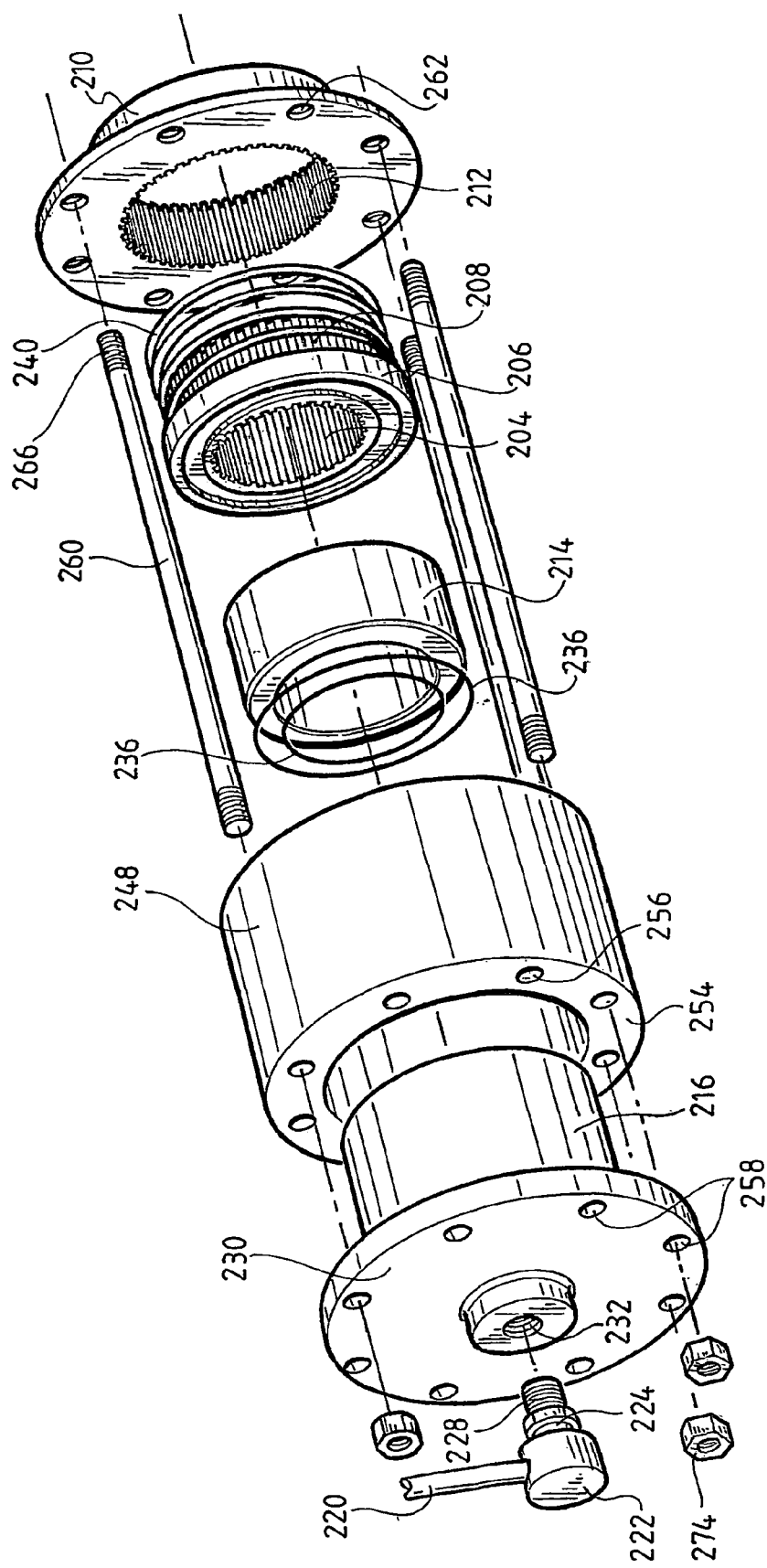
FIG. 13 is an exploded perspective view of the wheel hub assembly of FIG. 11.
Figure 14:
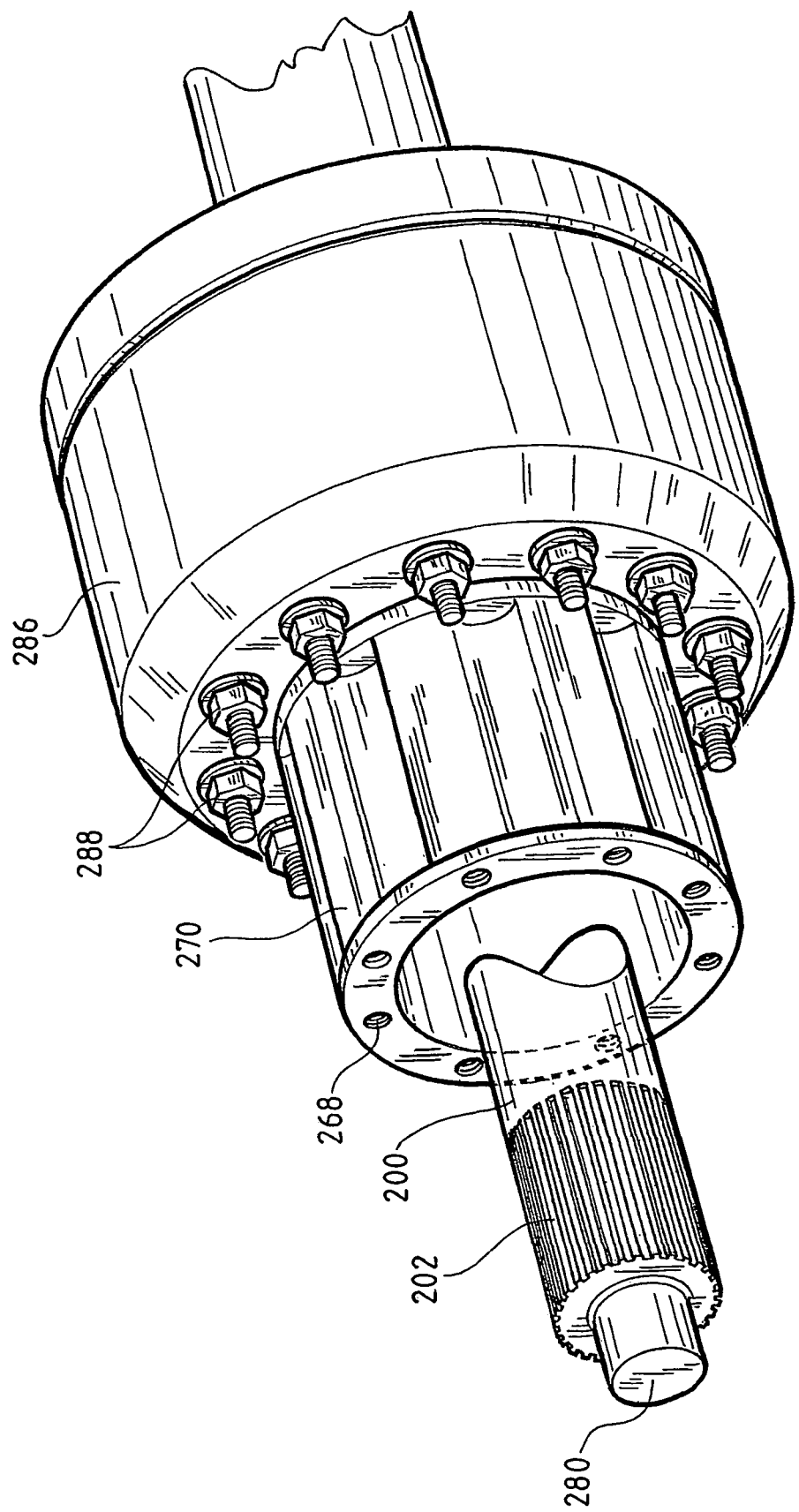
FIG. 14 is a partial perspective view of the wheel hub assembly of FIG. 11.

When the piston is slidably moved and in turn slidably moves the connecting gear, as illustrated in FIG. 12, it engages the drive gear so that there is rotational motion imparted to the axle and back into the drive mechanism.

As discussed previously, when the drive train assembly has been disconnected from any driving motion, some of the internal components still rotate with the drive wheels and lacking lubrication may be damaged. It may therefore be necessary to ensure that an oil pump will still operate even when the drive assembly has been disengaged at the in input shaft. An embodiment of this is illustrated in FIGS. 5–6 and 15–16, where an oil pump assembly is fitted onto the existing drive assembly.

As already shown drive train assembly 110 includes a yoke 112 engaging an input shaft 114 by engaging first splines 116 and is held in place by the use of nut 118 engaging threads 120, washer 122 disposed between the nut and the end of the input shaft. The input shaft includes second splines 124 adapted to drive an oil pump assembly 126 that distributes oil within the drive train assembly 110 and individual components discussed earlier. Positioned next to the oil pump assembly is a bearing cage 128 including cone bearings 130. Although not shown, the yoke is connected to the system of a vehicle that in turn is connected to the transmission and the engine. It can thus be seen that the oil pump will only pump oil around the assembly when the input shaft is rotating.

As discussed above power is provided to the drive wheel assemblies through the helical drive 134 and the rear side gear 164. The helical drive 134 is itself rotated by the forward side gear 136 that therefore is only driven when the clutch collar assembly slides across both the gear wheel 132 and the forward side gear 136.

It will thus become apparent to the reader that when the clutch collar does not engage the forward side gear 136, the helical drive and ultimately the wheels are not directly driven. Under those circumstances the wheels spin independently of the rotation of the input shaft, that is connected to the gears and accordingly to the engine through the transmission. Consequently one can also observe that if the engine is not running or rotating, but the trailer is towed, the wheels and helical drive are still rotating around a stationary input shaft. Ergo, the oil pump is also not running resulting in a loss of lubrication to those parts that are still rotating such as the helical drive, forward and rear side gears, the driven helical gear and associated bearings.

Accordingly as illustrated in FIGS. 5 and 6 an oil pump assembly 300 is mounted generally below the input shaft and is driven by drive shaft 302 that is provided rotational motion from the wheels through the crown wheel 178 and drive gear pinion 176. The oil pump includes a rotor 304 attached to gearwheel 306 in contact with spline drive shaft 308 that is connected to the drive shaft 302. The oil pup assembly 300 lubricates the same parts as oil pump 126. It is to be appreciated by the reader that other types of connection arrangements may equally well be employed provided rotational power is transferred to the oil pump.

It is also to be understood that the oil pump assembly may be used in each drive train assembly.

The rotor is fed oil through pipe 310 connected to the bottom of the drive train assembly casing 312, filter 314 ensuring that no particulates enter the pump and damage the rotor. The oil is then pumped through intake tube 316, bypass 318 and into the drive train assembly In operation one can see that the present oil pump assembly being driven by the drive wheels and independent of the engine rotation ensures that oil which is vital for lubrication and heat dissipation is circulated through the drive train assembly when the drive wheels are rotating.

Figure 15:
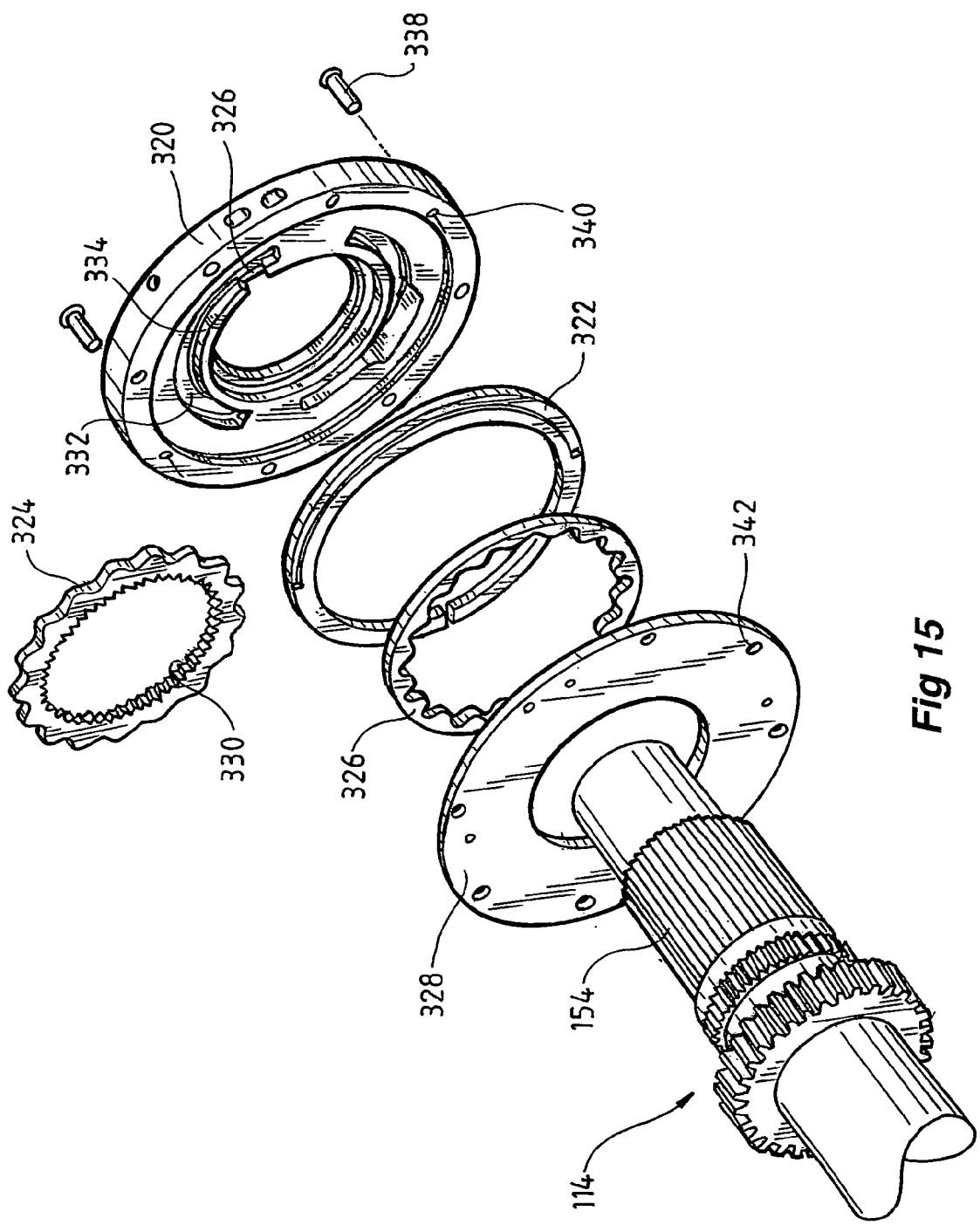
FIG. 15 is a perspective exploded view detailing the separate components of the modified oil pump assembly previously driven by the input shaft.
Figure 16:
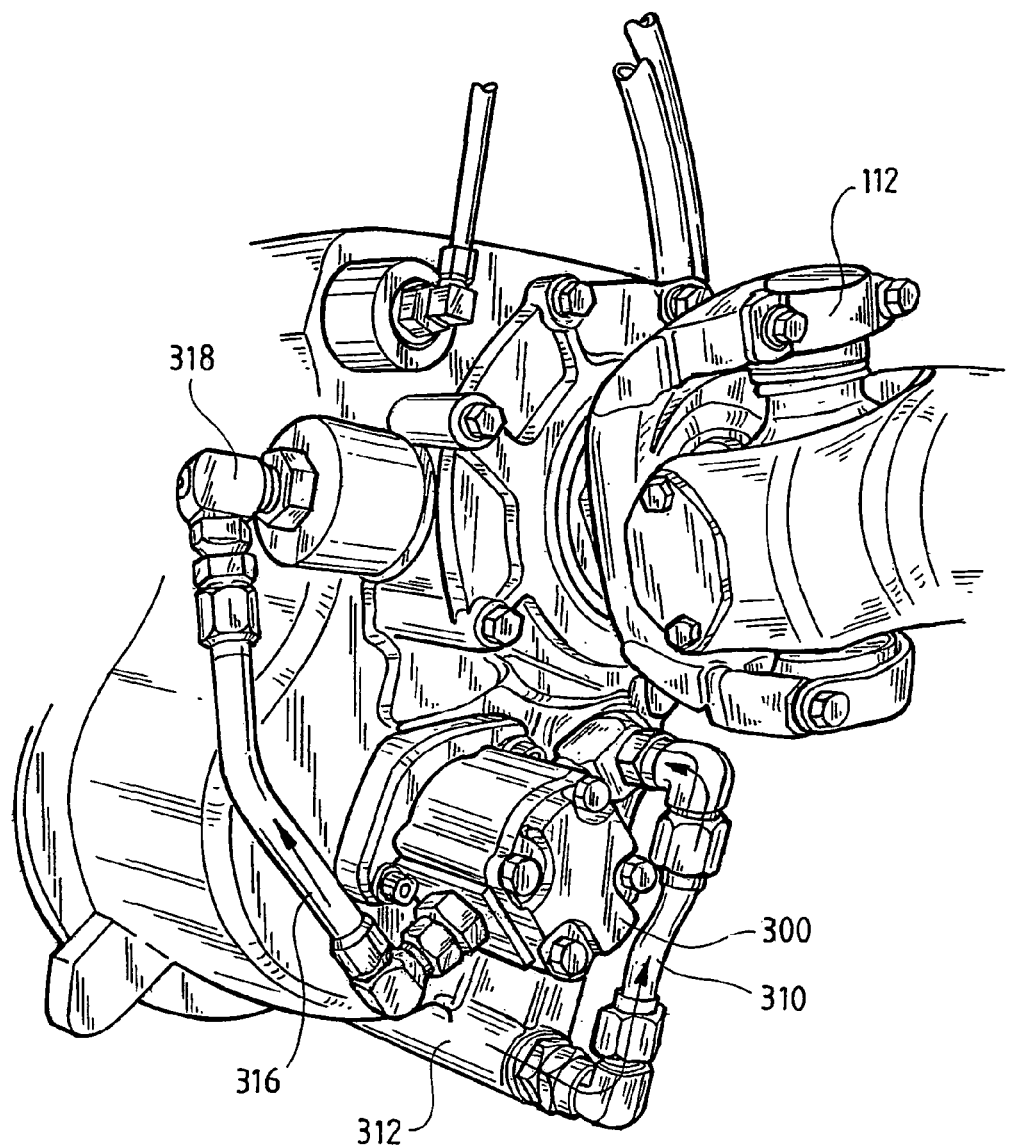
FIG. 16 is an external perspective view of a drive train assembly illustrating the positioning of the oil pump according to the present invention.

As a further advantage to the present invention, the existing oil pump may be modified. As illustrated in FIG. 15 an existing oil pump includes housing 320, direction control plate 322, rotor 324, external gear 326, and cover 328. The rotor 324 includes internal splines 330 that are normally driven by the input shaft. Since this oil pump is no longer required, the external gear can be dispensed with. However, to ensure that oil still flows through the existing oil pump, the housing 320 needs to be modified by constructing a pathway from the center of the pump to grooves 332 in the housing. This can be achieved by machining housing to remove a portion of the internal flange 334 near the relief valve so as to construct an oil flow pathway 336. The assembly is held together by the use of fixing means such as screws 338 passing through apertures 340 in the housing 320 and through apertures 342 in the cover 328.

These modifications are used to prevent the pump, which is no longer required, from being damaged while avoiding the inconvenience of removing the pump. It is however not meant as an alternative to the pump assembly 300.

In some instances the operator may wish to run the engine of the power trailer without engaging the wheels. This may be advantageous when the power trailer engine may be used to provide power for other uses. For example the power trailer may be used to operate a hydraulic pump that causes the trailer to tip its load-carrying bay. Alternatively, the power trailer may simply be used as a source of hydraulic power for use in other applications such as a fluid pump. This would of course require further modification of the drive train assembly.

The unique configuration of the drive train assembly as described above overcomes the problems of conventional drive trains wherein when the drive wheels are rotated, the rotational motion is imparted to the input shaft and hence the transmission and the engine. The unique configuration allows the operator to disengage the engine from the drive wheels so that when the powered trailer is towed, the drive wheels do not rotate the transmission and the engine. The unique configuration also results in the wheels always being in a power mode, that is, all the wheels are powered when the power trailer engine is powering the trailer. Hitherto it has been thought that in vehicles, such as four wheel drives, that powering all the wheels at the same time on a solid road surface would cause difficulties when turning due to the different swept path of the drive wheels. However in the present application it has been discovered that the relatively small difference in the swept pathway are compensated by wheel slippage that does not cause any problems in the operation of the power trailer and all the wheels can be in power mode.

In operation a power trailer may be advantageously utilised to transport payload from a source to a depot, the use of the power trailer increasing the payload capability of the road-train. On the return journey, when the road-train is not carrying any payload, the power trailer engine is shut off, and the drive wheel assemblies of the power trailer disengaged from its input shaft. This protects the transmission from damage it would have been exposed to if it were to be driven by the wheels and therefore increases the working life of the power trailer engine whilst at the same time saving on fuel. Furthermore by eliminating rotational motion of the input shaft, and transmission, the load experienced by the primary vehicle of the empty road-train is further reduced leading to less fuel needed.

It will also be appreciated by the reader that the present invention may equally well be used in underground mines with existing roadways and where the incline of the roadways may be such that large payloads may only be transportable if there is sufficient traction provided by the road-train. Thus, in one mode of the operation, when transporting the payload in and underground roadway with no incline, the operator may select that the power be provided solely by the primary vehicle engine of the road-train. When the payload is to be transported up or down an incline the operator may choose to utilise the power trailer engine to provide additional traction. This would be especially useful when going up an incline.

As can be readily apparent, the steeper the incline in an underground mine, the shorter the required roadway to bring payload to the surface. Since the construction of underground roadways is in itself an expensive exercise, the use of a road-train with one or more powered trailers can lead to an operational requirement of shorter tunnels which is obviously a significant cost saving. Moreover, a road-train can be long whilst of a relatively small cross-section. This leads to underground roadways of a smaller cross-sectional size, which also leads to cost reductions in their construction. Thus a road train including a power trailer used to haul ore can haul a greater weight than a conventional mining truck and yet be of a smaller cross-sectional size. Not only is the road train as a whole cheaper to manufacture and operate, being relatively long, it also requires a smaller cross-sectional roadway to be constructed in underground mines. The advantages of this are obvious.

It is also to be understood wherein reference has been made to a powered trailer, the present invention may equally well be applied to powered dollies for use in connection with another powered vehicle. Powered dollies are trailers that are mounted onto the prime mover through a dolly arrangement and are not separate trailers, that is, they are supported at the front by the prime mover. However, the other configuration remains the same, that is, the power dolly includes an engine coupled to the read drive wheels.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

The invention claimed is:

1. A drive train assembly for use in powered vehicles or trailers, said drive train assembly adapted to provide power to a first wheel assembly, said drive train assembly comprising:
    an input shaft having a fixed gear assembly, said input shaft adapted to be rotatably coupled to a source of motive power, said fixed gear assembly being rotatable with the input shaft;
    a helical drive adapted to rotate about said input shaft and having a first side gear and a second side gear located on opposite sides thereof, said first side gear being located adjacent said fixed gear assembly;
    a drive disconnect gear assembly adapted to rotate about said input shaft and including two gear discs fixed to each other and extending in opposite directions, one said gear disc adapted to engage said second side gear and the other gear disc adapted to engage a thru-shaft gear to provide power to a second wheel assembly;
    a clutch collar slidable from a first to a second position, wherein in said first position said clutch collar engages said fixed gear assembly and wherein in said second position said clutch collar engages both said fixed gear assembly and said first side gear;
    wherein when said clutch collar is in said first position said input shaft is decoupled from said first wheel assembly; and
    wherein when in the second position said clutch collar thereby causes any rotational motion of said input shaft and said fixed gear assembly to be transferred to said drive disconnect gear assembly and to said first wheel assembly.

2. The drive train assembly of claim 1, including a third wheel assembly that is provided power through said thru-shaft gear.

3. The drive train assembly of claim 1, wherein said source of motive power comprises an internal combustion engine.

4. The drive train assembly of claim 1, wherein said clutch collar includes a biasing mechanism adapted to keep said collar in said first position.

5. The drive train assembly of claim 4, wherein said biasing mechanism comprises a spring.

6. The drive train assembly of claim 1, wherein said clutch collar sliding motion is achieved by the use of a solenoid.

7. A drive train assembly for use in powered vehicles or trailers, said drive train assembly adapted to provide power to a first wheel assembly, said drive train assembly comprising:
    an input shaft having a fixed gear assembly, said input shaft adapted to be rotatably coupled to a source of motive power, said input shaft being rotatably coupled to said source of motive power through a gear box, said fixed gear assembly being rotatable with said input shaft;
    a helical drive adapted to rotate about said input shaft and having a first side gear and a second side gear located on opposite sides thereof, said first side gear being located adjacent said fixed gear assembly;
    a drive disconnect gear assembly adapted to rotate about said input shaft and including two gear discs fixed to each other and extending in opposite directions, one said gear disc adapted to engage said second side gear and the other gear disc adapted to engage a thru-shaft gear to provide power to a second wheel assembly;
    a clutch collar slidable from a first to a second position, wherein in said first position said clutch collar engages said fixed gear assembly and wherein in said second position said clutch collar engages both said fixed gear assembly and said first side gear;
    wherein when said clutch collar is in the first position the input shaft is decoupled from the wheel assembly; and
    wherein when in the second position the clutch collar thereby causes any rotational motion of the input shaft and the fixed gear assembly to be transferred to the drive disconnect gear assembly and to the wheel assembly.

8. A drive train assembly for use in powered vehicles or trailers, said drive train assembly adapted to provide power to a first wheel assembly, said drive train assembly comprising:
    an input shaft having a fixed gear assembly, said input shaft adapted to be rotatably coupled to a source of motive power, said fixed gear assembly being rotatable with said input shaft;
    a helical drive adapted to rotate about said input shaft and having a first side gear and a second side gear located on opposite sides thereof, said first side gear being located adjacent said fixed gear assembly;
    a drive disconnect gear assembly adapted to rotate about said input shaft and including two gear discs, said gear discs being similar in construction, said gear discs being fixed to each other and extending in opposite directions, one said gear disc adapted to engage said second side gear and the other gear disc adapted to engage a thru-shaft gear to provide power to a second wheel assembly;

a clutch collar slidable from a first to a second position, wherein in said first position said clutch collar engages said fixed gear assembly and wherein in said second position said clutch collar engages both said fixed gear assembly and said first side gear;

wherein when said clutch collar is in the first position the input shaft is decoupled from the wheel assembly; and wherein when in the second position the clutch collar thereby causes any rotational motion of the input shaft and the fixed gear assembly to be transferred to the drive disconnect gear assembly and to the wheel assembly.

9. A drive train assembly for use in powered vehicles or trailers, said drive train assembly adapted to provide power to a first wheel assembly, said drive train assembly comprising:

an input shaft having a fixed gear assembly, said input shaft adapted to be rotatably coupled to a source of motive power, said fixed gear assembly being rotatable with said input shaft;

an oil pump assembly rotationally coupled to said first wheel assembly to pump oil within said first wheel assembly independent of the rotation of said input shaft;

a helical drive adapted to rotate about said input shaft and having a first side gear and a second side gear located on opposite sides thereof, said first side gear being located adjacent said fixed gear assembly;

a drive disconnect gear assembly adapted to rotate about said input shaft and including two gear discs, said gear discs being fixed to each other and extending in opposite directions, one said gear disc adapted to engage said second side gear and the other gear disc adapted to engage a thru-shaft gear to provide power to a second wheel assembly;

a clutch collar slidable from a first to a second position, wherein in said first position said clutch collar engages said fixed gear assembly and wherein in said second position said clutch collar engages both said fixed gear assembly and said first side gear;

wherein when said clutch collar is in the first position the input shaft is decoupled from the wheel assembly;

wherein when in the second position the clutch collar thereby causes any rotational motion of the input shaft and the fixed gear assembly to be transferred to the drive disconnect gear assembly and to the wheel assembly.

10. A drive train assembly for use in powered vehicles or trailers, said drive train assembly adapted to provide power to a first wheel assembly, said first wheel assembly including a crown wheel, said drive train assembly comprising:

an input shaft having a fixed gear assembly, said input shaft adapted to be rotatably coupled to a source of motive power, said fixed gear assembly being rotatable with said input shaft;

an oil pump assembly rotationally coupled to said first wheel assembly to pump oil within said first wheel assembly independent of the rotation of said input shaft, said oil pump including a drive shaft mechanically coupled to said crown wheel;

a helical drive adapted to rotate about said input shaft and having a first side gear and a second side gear located on opposite sides thereof, said first side gear being located adjacent said fixed gear assembly;

a drive disconnect gear assembly adapted to rotate about said input shaft and including two gear discs, said gear discs being fixed to each other and extending in opposite directions, one said gear disc adapted to engage said second side gear and the other gear disc adapted to engage a thru-shaft gear to provide power to a second wheel assembly;

a clutch collar slidable from a first to a second position, wherein in said first position said clutch collar engages said fixed gear assembly and wherein in said second position said clutch collar engages both said fixed gear assembly and said first side gear;

wherein when said clutch collar is in the first position the input shaft is decoupled from the wheel assembly;

wherein when in the second position the clutch collar thereby causes any rotational motion of the input shaft and the fixed gear assembly to be transferred to the drive disconnect gear assembly and to the wheel assembly.

* * * * *